United States Patent [19]
Rambo

[11] 3,736,589
[45] May 29, 1973

[54] MEANS FOR GENERATING A FLAT-TOPPED PULSE WITH SINE-SQUARED RISE AND FALL CHARACTERISTICS

[75] Inventor: Sheldon I. Rambo, Baltimore, Md.

[73] Assignee: Westinghouse Electric Corporation, Pittsburgh, Pa.

[22] Filed: Dec. 13, 1971

[21] Appl. No.: 207,452

[52] U.S. Cl..................343/17.1 R, 328/61, 328/157
[51] Int. Cl.................................................G01s 7/28
[58] Field of Search .......................343/5 R, 17.1 R; 328/61, 156, 157, 158, 159, 185

[56] References Cited
UNITED STATES PATENTS

| | | | |
|---|---|---|---|
| 3,071,731 | 1/1963 | Rambo | 328/58 |
| 3,339,200 | 8/1967 | Rizzi | 343/17.1 R |

Primary Examiner—T. H. Tubbesing
Attorney—F. H. Henson and Dean Schron

[57] ABSTRACT

A summing amplifier receives a square wave pulse and portions of a sine-squared wave and, under control of gating pulses, produces a flat-topped pulse having sine-squared rise and fall characteristics, the timing and duration of which are determined by the gating pulses. The resulting pulse permits the functions of target illumination and tracking to be combined in a single radar transmitter.

6 Claims, 3 Drawing Figures

Patented May 29, 1973

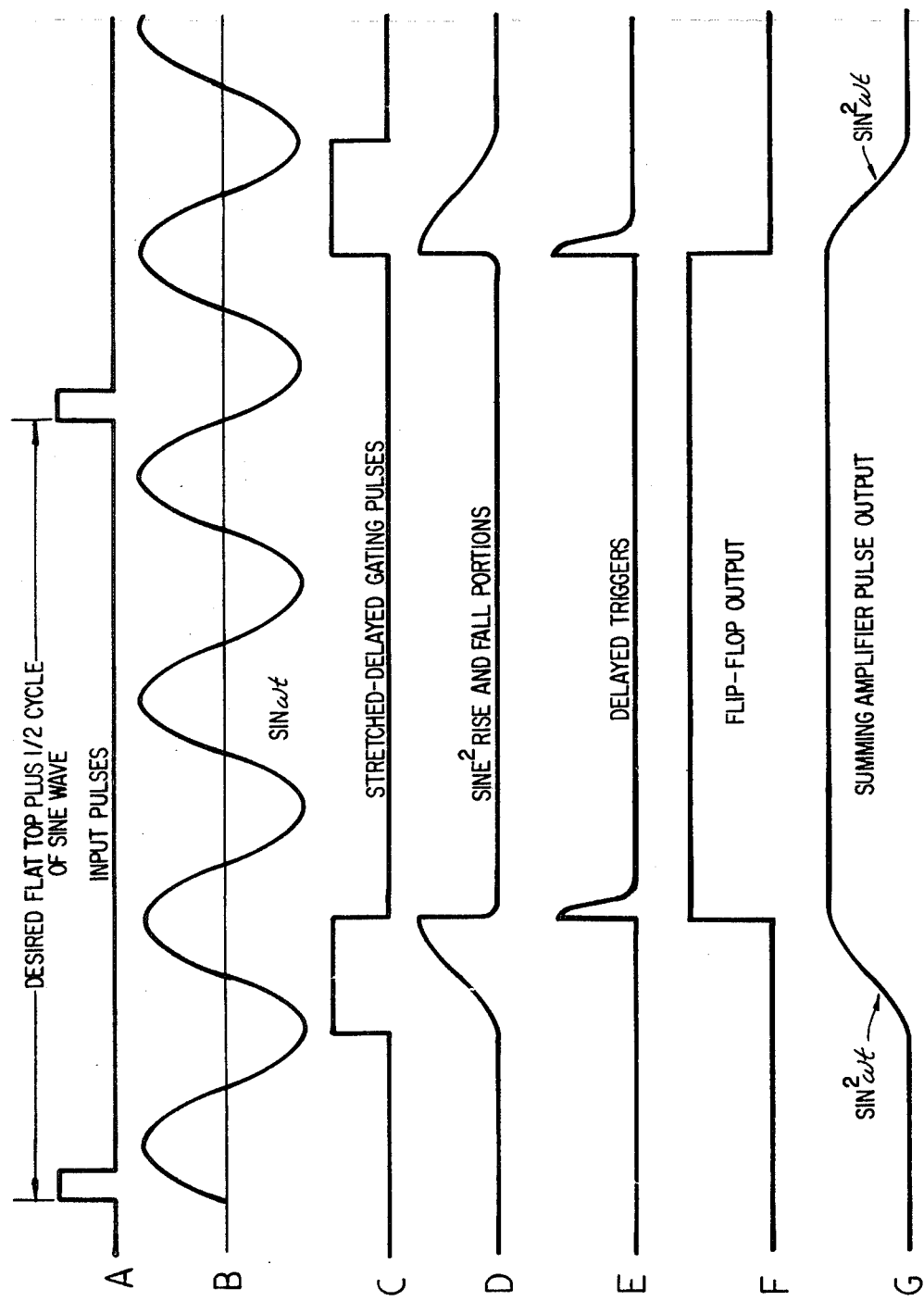
FIG. 2 GENERATOR WAVEFORMS 3,736,589

MEANS FOR GENERATING A FLAT-TOPPED PULSE WITH SINE-SQUARED RISE AND FALL CHARACTERISTICS

The invention herein described was made in the course of or under a contract or subcontract thereunder, with the United States Air Force.

BACKGROUND OF THE INVENTION

1. Field of the Invention

This invention relates to pulse generating apparatus and more particularly to such apparatus for generating a flat-topped pulse with sine-squared rise and fall characteristics.

2. State of the Prior Art

The need for shaping of pulses for radar systems to reduce side band splatter which interferes with other radar and communication systems, to improve signal to noise ratios, and for achieving various other desired effects, is well known in the field of radar. Sine-squared pulses, as developed heretofore, have afforded a significant reduction in side band splatter as compared with previous systems employing conventional pulse shapes. U.S. Pat. No. 3,071,731 granted Jan. 1, 1963, to S. I. Rambo, the inventor herein, and assigned to a common assignee discloses a circuit for generating sine-squared pulses and explains further some of the advantages afforded by use of such pulses in radar systems.

SUMMARY OF THE INVENTION

The present invention utilizes the advantageous characteristics of sine-squaring in producing a flat-topped pulse having sine-squared rise and fall characteristics, whereby the functions of target illumination and tracking can be combined in a single transmitter in certain radar systems. Combining the functions of target illumination and tracking in a single transmitter is possible only if the transmitted RF spectrum can be controlled to the extent that spurious RF energy does not obscure the desired doppler frequencies to be measured — or, alternatively stated, only if the spectrum of the long illumination pulse does not mask the echoes from the track pulses. The present invention permits this combined function to be performed by providing a suitably shaped pulse for this purpose, as generated by the circuit of the invention.

More specifically, a radar system synchronizer provides input pulses of short duration which are spaced in time to correspond to the desired "flat-top" pulse time interval. The input pulses are properly delayed in time to initiate gating of a sine wave at its trough, in the case of a first input pulse, and at its peak, in the case of a second, related input pulse. Each of the input pulses also is stretched in time duration to provide for a gating time of the sine wave corresponding exactly to one-half cycle of the sine wave.

The circuitry of the invention thus forms an increasing amplitude waveform of sine-squared properties associated with the occurrence of the first input pulse and, at a desired time interval later, forms a decreasing amplitude waveform of sine-squared properties associated with the occurrence of the second input pulse. Because of the gating function, both the rise and fall waveforms are made relative to a zero potential reference and achieve the same maximum amplitude at the completion of the gating period in the case of the first input pulse, and at the start of the gating period in the case of the second input pulse.

To complete the generation of a flat-topped pulse, the circuitry of the invention anticipates the first gate turn-on corresponding to the peak amplitudes of the rise and fall sine-squared waveforms. A multivibrator is triggered on at the precise time of the first gate turn-off and triggered off at the precise time of the second gate turn-on. Summing of the rise portion of the sine-squared wave, the multivibrator output, and the fall portion of the sine-squared wave results in the desired pulse. The pulse so formed may be generated periodically with a repetition rate determined by the frequency of occurrence of successive pairs of first and second input pulses.

BRIEF DESCRIPTION OF THE DRAWINGS

FIG. 2 shows signal waveforms $a$ through $f$ occurring in the pulse generator of FIG. 1 and waveform $g$ shows the desired flat-top pulse with sine-squared rise and fall portions produced in accordance with the invention.

DETAILED DESCRIPTION OF THE INVENTION

Figures 1, 3:
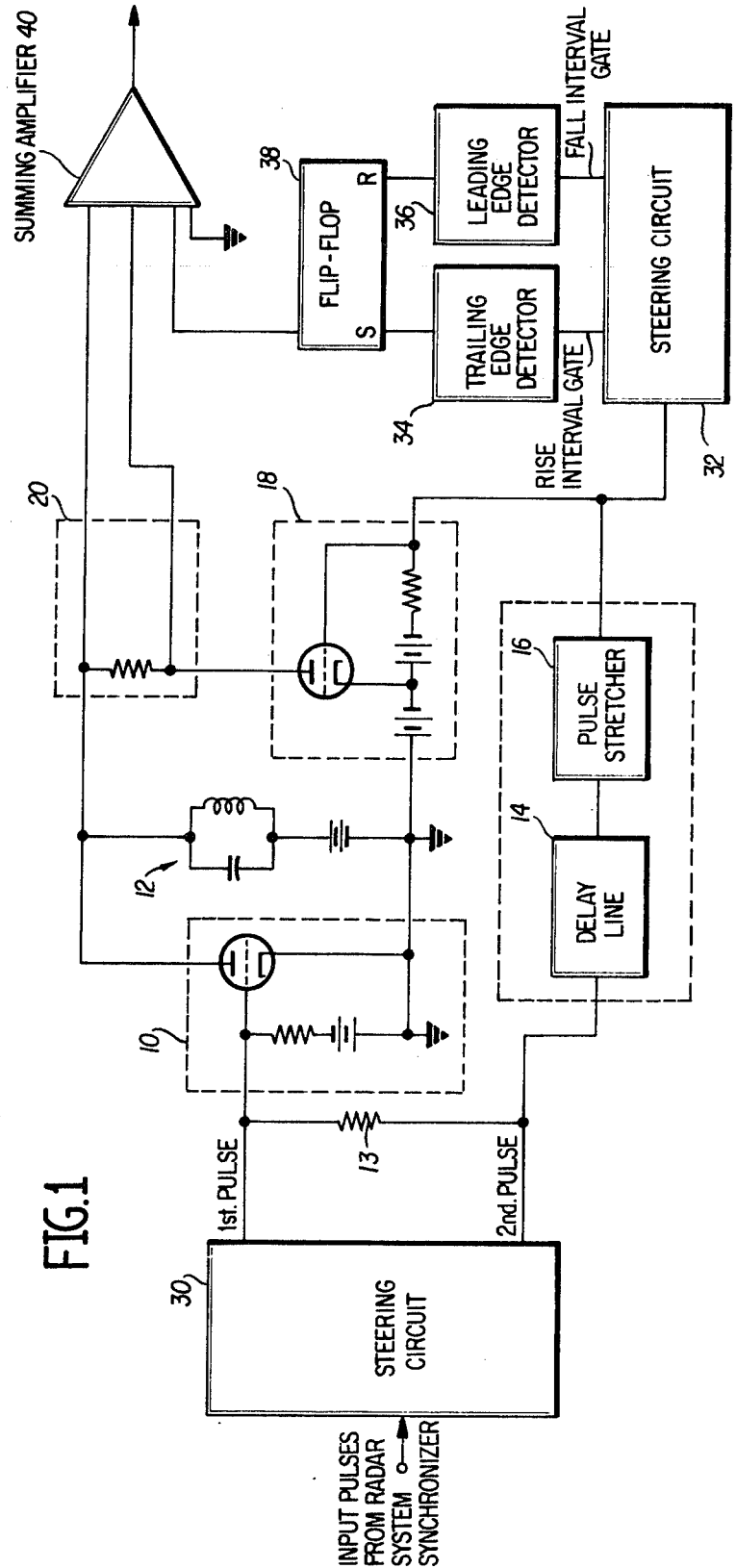
FIG. 1 is a circuit diagram of the pulse generator of the invention.
FIG. 3 is a waveform plot of combined flat-top illumination pulses with sine-squared rise and fall characteristics and tracking pulses, useful in a common transmitter in accordance with the invention.

The pulse generator of the invention may incorporate a circuit for generating sine-squared pulses similar to that disclosed in the aforementioned U.S. Pat. No. 3,071,731, which circuit is reproduced in part in FIG. 1. In general, that circuit as here employed includes an input network 10 which is triggered by an input pulse, supplied thereto in a manner to be described, for energizing an LC tank oscillator circuit 12. A delay line 14 and a pulse stretcher 16 respond to each of first and second input pulses to produce corresponding output gating interval pulses supplied to a gate network 18. When circuit 18 is gated on, a waveform having sine-squared characteristics is generated in the output network 20 which, as indicated, may comprise a resistor element. The generation of a sine-squared waveform by the circuit as described is explained in more detail in the referenced patent.

Considering now the circuit of FIG. 1 concurrently with the waveforms of $a$ through $g$ of FIG. 2, input pulses supplied by a radar system synchronizer are supplied as a pair of first and second input pulses defining between the leading edges of the pulses of each such pair a predetermined time duration corresponding to the desired width of the illuminate pulse. As explained more fully hereafter, that time duration defined by the input pulses includes an additional one-half cycle of the sine wave oscillation, waveform $b$ of FIG. 2 that time duration being equivalent to a gating interval. The reason for this additional time increment will appear hereafter.

The input pulses illustrated in waveform $a$ of FIG. 2 are supplied from the radar system synchronizer to a steering circuit 30 which identified the first pulse of each pair and supplied it to the input network 10, thereby to initiate the sine wave oscillation of the LC tank circuit 12 for producing the sine wave oscillation of FIG. 2$b$. The frequency of the sine wave oscillation is selected in accordance with the desired duration of the rise and fall portions of the flat-topped pulse to be generated.

As noted, the rise and fall intervals are developed by delay line 14 and pulse stretcher 16 and in accordance therewith both of the first and second pulses are supplied as inputs to the delay line 14. With reference to waveform c of FIG. 2, the delay line 14 introduced a delay of three-quarters of a cycle of the sine wave oscillation and the pulse stretcher 16 produces a gating pulse of one-half cycle of the sine wave oscillation such that the rise integral occurs from the trough to the peak of the sine wave oscillation. The second input pulse is spaced in time from the first by an interval number of cycles plus one-half cycle of the sine wave oscillation. The delay line 14 and pulse stretcher 16 correspondingly operate to generate a fall gating interval for one-half cycle of the sine wave and extending from the peak to the trough.

In accordance with the circuit function of the aforementioned patent, the delayed gating pulses thus produced as shown in waveform c of FIG. 2 are applied to the gating circuit 18 and result in producing, respectively, sine-squared rise and fall portions of a sine-squared waveform during the gating intervals in the output network 20. These waveforms are illustrated in waveform d of FIG. 2.

The delayed, stretched gating pulses are also supplied to a second steering circuit 32 which directs the rise interval gate to a trailing edge detector 34 and fall interval gate to a leading edge detector 36 which functions to produce the delayed triggers of waveform e in FIG. 2 in time coincidence with the trailing edge of the rise gating pulse and the leading edge of the fall gating pulse, respectively. These triggers are applied respectively to the set and reset inputs of a flip-flop 38, thereby to produce the constant amplitude pulse shown in waveform f of FIG. 2, labeled as the flip-flop output, and having a time duration defined by the triggers of FIG. 2e. The leading and trailing edges of the constant amplitude flip-flop output pulse, thus are made time coincident with the termination of the sine-squared rise waveform and the beginning of the sine-squared fall waveform, respectively, and the amplitude of the constant amplitude pulse furthermore is made equal to the peak amplitudes of those sine-squared rise and fall signals.

The sine-squared rise and fall signals and the constant amplitude pulse are supplied by the output network 20 and the flip-flop 38 to a summing amplifier 40 which produces the illuminate pulse of the noted characteristics illustrated in waveform g of FIG. 2.

As shown in FIG. 3, illuminate pulses of the prescribed characteristics produced in accordance with the circuit of the invention are generated at periodic intervals, as defined by the pairs of input pulses, in alternating succession with track signals as may be generated in conventional fashion for supply to a common transmitter of a radar system. As before noted, such operation is permitted in view of the reduced side band splatter which is realized in use of an illuminate pulse of the waveform prescribed and afforded by the invention.

Numerous modifications and adaptations of the generator of the invention and the method of producing and utilizing the flat-topped pulse having sine-squared rise and fall characteristics, enabling combining illuminate and track functions in a common transmitter of a radar system, will be apparent to those skilled in the art and thus it is intended by the appended claims to cover all such adaptations and modifications as fall within the true spirit and scope of the invention.

What is claimed is:

1. A pulse generator for generating constant amplitude illuminate pulses having sine-squared rise and fall characteristics, comprising:
   first means responsive to each of a pair of first and second input pulses for defining in predetermined time relationship thereto, rise and fall intervals of predetermined time duration,
   second means for generating during the rise and fall intervals as defined by said first means, sine-squared rise and fall signals of substantially equal peak amplitudes, respectively,
   third means for generating a pulse coincident at its initiation with the termination of the rise interval and coincident at its termination with the initiation of the fall interval and of constant amplitude equal to the peak amplitudes of the rise and fall signals, and
   summing means for receiving said sine-squared rise and fall signals from said second means and said constant amplitude pulse from said third means for producing a composite flat-topped pulse of predetermined duration having sine-squared rise and fall characteristics.

2. A pulse generator as cited in claim 1 wherein:
   said second means includes oscillation means responsive to the first input pulse of each pair for generating a sine wave signal having a period of oscillation twice that of each of the rise and fall intervals, the time duration between the first and second pulses of each pair corresponding to an odd number of half-cycles of the sine wave oscillation,
   said first means includes delay means for defining the initiation of the rise and fall intervals of a predetermined time duration after the first and second pulses, respectively, and
   said second means further includes gating means enabled during the rise and fall intervals defined by said first means for producing the corresponding sine-squared rise and fall signals from the sine wave signal produced by said oscillation means.

3. A pulse generator as recited in claim 2 wherein said first means further includes pulse stretching means for receiving the input pulses as delayed by said delay means and generating in response thereto output pulses of the predetermined time duration of the rise and fall intervals.

4. A pulse generator as recited in claim 1 wherein said third means comprises a bistable electronic circuit normally in a reset state and switched to the set state in response to the termination of the rise interval and to the reset state in response to the initiation of the fall interval, the set output thereof affording the constant amplitude portion of the illuminate pulse.

5. For use in a radar system having a common transmitter for combined target illumination and tracking said system providing a pair of first and second input pulses to a pulse generator for defining the interval of the illumination pulses and the timing thereof, the improvement comprising:
   first means responsive to each of the pair of first and second input pulses for generating a constant amplitude output signal for a predetermined time duration as determined by the time duration between the first and second input pulses of each such pair, second means responsive to each of the pair of first and second input pulses to define the respectively corresponding rise and fall intervals of the illumination pulse and to produce output signals having waveforms of sine-squared rise and fall characteristics during those respective intervals, and third means for combining the sine-squared rise and fall signals with the constant amplitude signal for producing a composite signal of constant amplitude of desired duration with sine-squared rise and fall characteristics as the illumination signal.

6. In a radar system having a common transmitter for illumination and tracking signals, the method of operation comprising:

defining in alternating sequence time intervals for transmission of illumination and tracking signals, and generating for transmission in each illumination interval a constant amplitude illumination pulse of predetermined duration and having sine-squared rise and fall characteristics.

* * * * *